United States Patent
Li et al.

(10) Patent No.: US 6,782,145 B2
(45) Date of Patent: Aug. 24, 2004

(54) METHOD AND SYSTEM FOR PROVIDING A SIMPLIFIED IN-LINE OPTICAL CIRCULATOR

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 147 days.

(21) Appl. No.: 09/832,492

(22) Filed: Apr. 11, 2001

(65) Prior Publication Data

US 2002/0150321 A1 Oct. 17, 2002

(51) Int. Cl.$^7$ .............. G02B 6/27; G02B 5/30
(52) U.S. Cl. .............. 385/11; 385/15; 385/27; 359/495; 359/496; 359/497
(58) Field of Search .............. 385/11, 15, 27; 359/484, 494–497

(56) References Cited

U.S. PATENT DOCUMENTS 6,366,402 B1 * 4/2002 Li .............. 359/484

\* cited by examiner

*Primary Examiner*—Akm Enayet Ullah
*Assistant Examiner*—Jerry T Rahll
(74) *Attorney, Agent, or Firm*—Sawyer Law Group LLP (57) ABSTRACT

A method and system for providing an optical circulator is disclosed. The optical circulator includes a first port, a second port and a third port adjacent to the first port. The optical circulator also includes a first birefringent material, a first rotator pair, a polarization beam deflector, a second birefringent material, a second rotator pair and a third birefringent material. The first birefringent material is optically coupled to the first port and the third port and has a longitudinal axis, a transverse direction perpendicular to the longitudinal axis, and a first displacement direction. The polarization beam deflector changes the direction of the optical signal without introducing a walk-off in the optical signal. The first displacement direction is at a first oblique angle from the transverse direction. The third birefringent material has the longitudinal axis, the transverse direction perpendicular to the longitudinal axis, and a third displacement direction at a second oblique angle from the transverse direction.

24 Claims, 7 Drawing Sheets

METHOD AND SYSTEM FOR PROVIDING A SIMPLIFIED IN-LINE OPTICAL CIRCULATOR

FIELD OF THE INVENTION

The present invention relates to optical technology, and more particularly to a method and system for providing an in-line optical circulator.

BACKGROUND OF THE INVENTION

Conventional optical circulators are used for many purposes. For example, conventional optical circulators may be employed in systems transmitting optical signals in order to transmit optical signals in a particular direction. In a three port optical circulator, an optical signal input at the first port will be transmitted to the second port. An optical signal input at the second port will be transmitted to the third port. However, optical signals will not be transmitted in the reverse direction. For example, an optical signal input at the second port will not be transmitted to the first port. Optical circulators can also come in a variety of configurations. One desirable configuration is an in-line optical circulator in which the first and third ports are adjacent, while the second port is at the opposing side of the system.

One prior art optical circulator is described in U.S. Pat. No. 5,909,310 by Li, et al and shown in FIG. 1A. This conventional optical in-line circulator 10 includes a first port 12, a second port 14 and a third port 16. The conventional optical in-line circulator 10 also includes a first collimator 18, a first birefringent crystal 20, a first pair of half wave plates 22A and 22B, a first Faraday rotator 24, a conventional Wollaston prism 26, a second birefringent crystal 28, a second Faraday rotator 30, a second pair of half wave plates 32A and 32B, a third birefringent crystal 34, a second collimator 36 and the fiber for the second port 14.

Figure 1A:
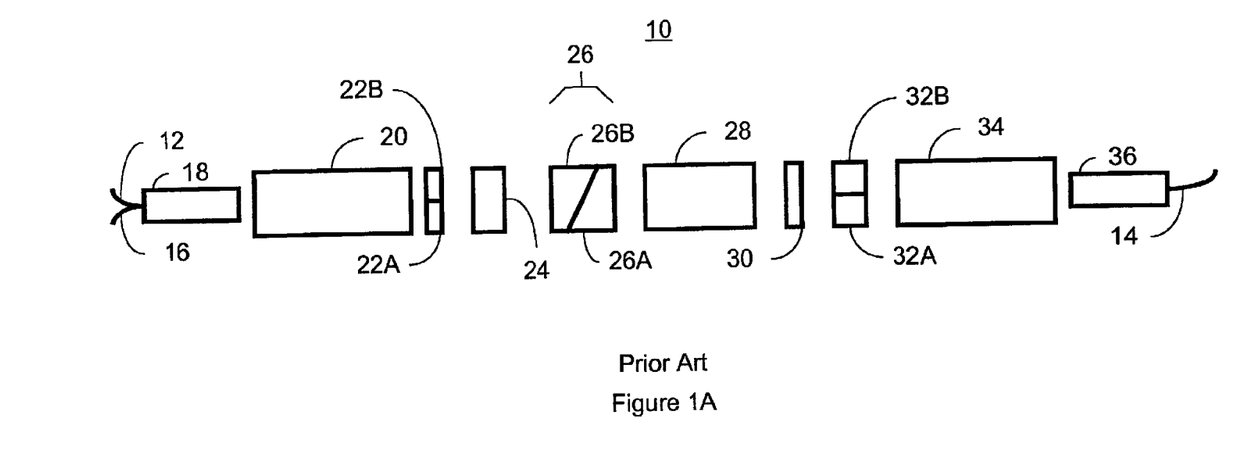
FIG. 1A is a diagram of a conventional optical circulator.
Figure 1B:
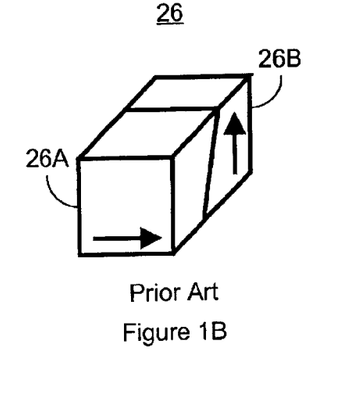
FIG. 1B depicts the conventional Wollaston prism often used with the conventional optical circulator.

This conventional optical in-line circulator suffers from disadvantages. First, the optical axes half wave plates 22A and 22B in the first pair of wave plates and the first birefringent crystal 20 need to be aligned to each other. Similarly, the optical axes of the half wave plates 32A and 32B in the second pair of wave plates and the second birefringent crystal 34 also need to be aligned to each other. These alignment procedures that are required in the manufacturing process are complicated and difficult. Therefore, the tolerance of the relative orientation of the directions of the optical axes of the wave plates 22A, 22B and 32A, 32B are relatively high, which yields a lower isolation. Thus, manufacturing is made more complex and expensive. In addition, temperature dependent phase retardation for the half wave plates 22A, 22B, 32A and 32B gives the circulator a narrower temperature bandwidth for isolation.

Figure 2:
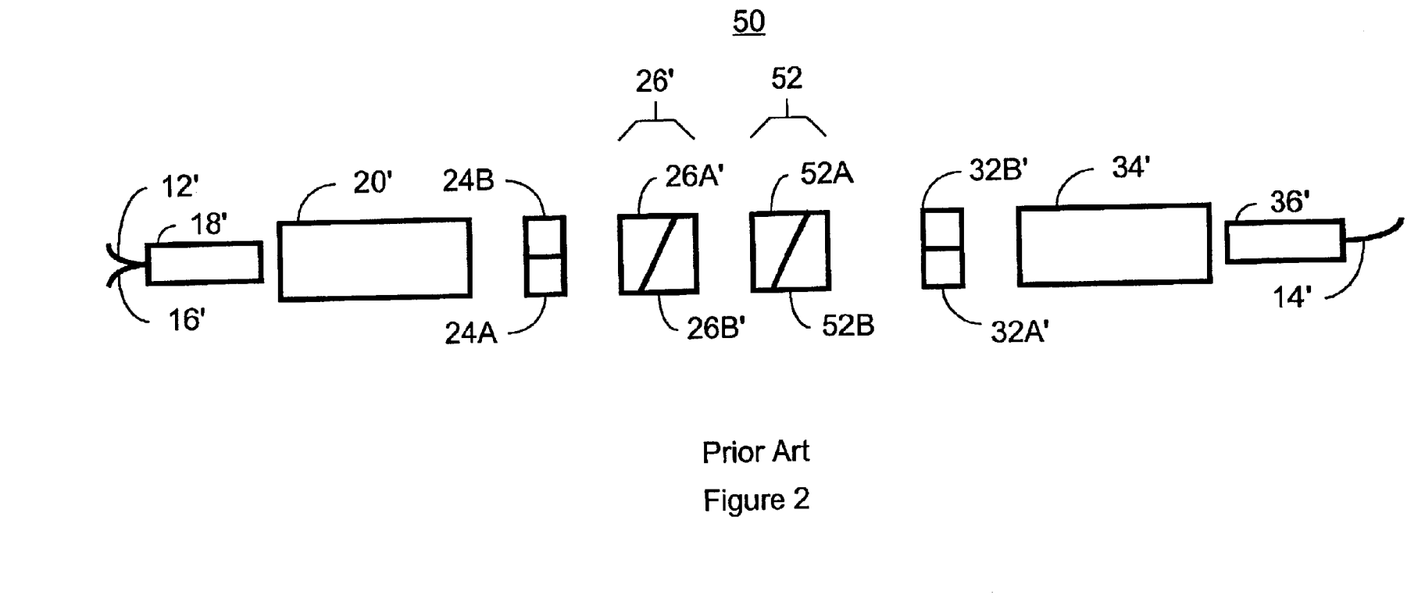
FIG. 2 depicts another conventional optical circulator.

U.S. Pat. No. 6,049,426 by Xie et al. ("Xie") describes another conventional in-line optical circulator. FIG. 2 depicts a conventional in-line optical circulator 50 in accordance with the teachings of Xie. It does not utilize any half wave plates and eliminates one birefringent crystal. However, the optical circulator of Xie uses an additional Wollaston prism 52 having wedges 52A and 52B. One of ordinary skill in the art will readily realize that the conventional in-line optical circulator 50 is relatively difficult to manufacture with higher cost. The optical circulator 50 suffers from two drawbacks. First, the optical circulator 50 uses two Wollaston prisms 26' and 52. As described above, Wollaston prisms 26' and 52 are relatively difficult and expensive to manufacture. The cost is thus increased by the additional number of Wollaston prism. Thus, although the half-wave plates 22A, 22B, 32A and 32B have been eliminated, the addition of a Wollaston prism still renders the optical circulator of Xie expensive and difficult to manufacture. Second, since the beam deflection angular tolerance introduced by Wollaston prisms is accumulated with the number of Wollaston prisms used, the beam deflection angular tolerance introduced by Wollaston prisms 26' and 52 in circulator 50 is doubled compared with the circulator with only one Wollaston prism, making optical alignment and, therefore, manufacture more difficult and complex.

Accordingly, what is needed is a system and method for providing an optical circulator that is simpler to manufacture with a lower cost. The present invention addresses such a need.

SUMMARY OF THE INVENTION

The present invention provides a method and system for providing an optical circulator. The optical circulator comprises a first port, a second port and a third port adjacent to the first port. The optical circulator also comprises a first birefringent material, a first rotator pair, a polarization beam deflector, a second birefringent material, a second rotator pair and a third birefringent material. The first birefringent material is adjacent to the first and third ports. The first rotator pair, second birefringent material, second rotator pair and third birefringent material follow in order, with the third birefringent material being closest to the second port. The first birefringent material is optically coupled to the first port and the third port and has a longitudinal axis, a transverse direction perpendicular to the longitudinal axis, a first displacement direction and a first length. The first displacement direction is at a first oblique angle from the transverse direction. The polarization beam deflector changes the direction of the optical signal without introducing a walk-off in the optical signal. The second birefringent material having the longitudinal axis and a second displacement direction, the second displacement direction being perpendicular to the longitudinal axis. The third birefringent material has the longitudinal axis, the transverse direction perpendicular to the longitudinal axis, a third displacement direction and a second length. The third displacement direction is at a second oblique angle from the transverse direction. As a result, a first optical path is established from the first port to the second port, and a second optical path is established from the second port to the third port such that when an optical signal is input at the first port the optical signal travels along the first optical path to the second port and when the optical signal is input to the second port the optical signal travels along the second optical path to the third port.

According to the system and method disclosed herein, the present invention provides an in-line optical circulator which can be more easily and cheaply manufactured than conventional in-line optical circulators. In particular, the optical circulator can be made with only a single polarization beam deflector and without the use of any half-wave plates, making the optical circulator in accordance with the present invention more economical, simpler to fabricate and have better performance for isolation.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional optical circulators have many uses in optical technology. A three port conventional optical circulator transmits signals from the first port to the second port, and from the second port to the third port, but not the reverse. Although the conventional optical circulators such as the conventional optical circulator 10 shown in FIG. 1A and the conventional optical circulator 50 shown in FIG. 2 function, one of ordinary skill in the art will readily realize that the conventional optical circulators may have a more complex configuration, be difficult to manufacture and have a higher cost.

The present invention provides a method and system for providing an optical circulator. The optical circulator comprises a first port, a second port and a third port adjacent to the first port. The optical circulator also comprises a first birefringent material, a first rotator pair, a second birefringent material, a second rotator pair and a third birefringent material. The first birefringent material is adjacent to the first and third ports. The first rotator pair, second birefringent material, second rotator pair and third birefringent material follow in order, with the third birefringent material being closest to the second port. The first birefringent material is optically coupled to the first port and the third port and has a longitudinal axis, a transverse direction perpendicular to the longitudinal axis, a first displacement direction and a first length. The first displacement direction is at a first oblique angle from the transverse direction. The second birefringent material having the longitudinal axis and a second displacement direction, the second displacement direction being perpendicular to the longitudinal axis. The third birefringent material has the longitudinal axis, the transverse direction perpendicular to the longitudinal axis, a third displacement direction and a second length. The third displacement direction is at a second oblique angle from the transverse direction. As a result, a first optical path is established from the first port to the second port, and a second optical path is established from the second port to the third port such that when an optical signal is input at the first port the optical signal travels along the first optical path to the second port and when the optical signal is input to the second port the optical signal travels along the second optical path to the third port.

The present invention will be described in terms of an optical circulator having specific components having a specific configuration. Similarly, the present invention will be described in terms of optical circulator components having specific relationships, such as distances or angles between components. However, one of ordinary skill in the art will readily recognize that this method and system will operate effectively for other components having similar properties, other configurations, and other relationships between components.

Figure 3A:
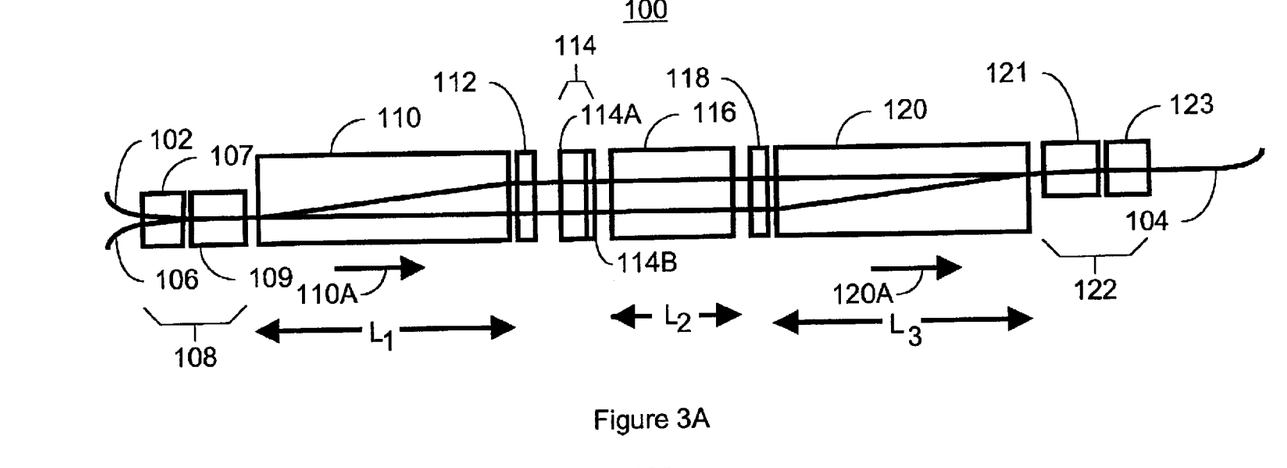
FIG. 3A depicts a top view of one embodiment of an optical circulator in accordance with the present invention.
Figure 3B:
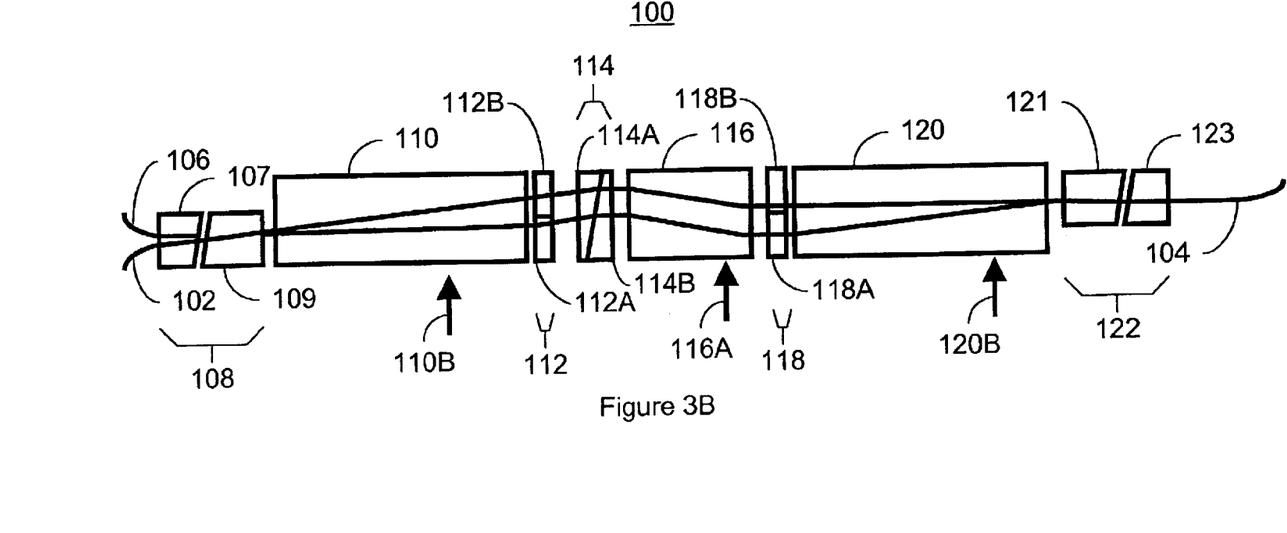
FIG. 3B depicts a side view of the embodiment of an optical circulator in accordance with the present invention.
Figure 3C:
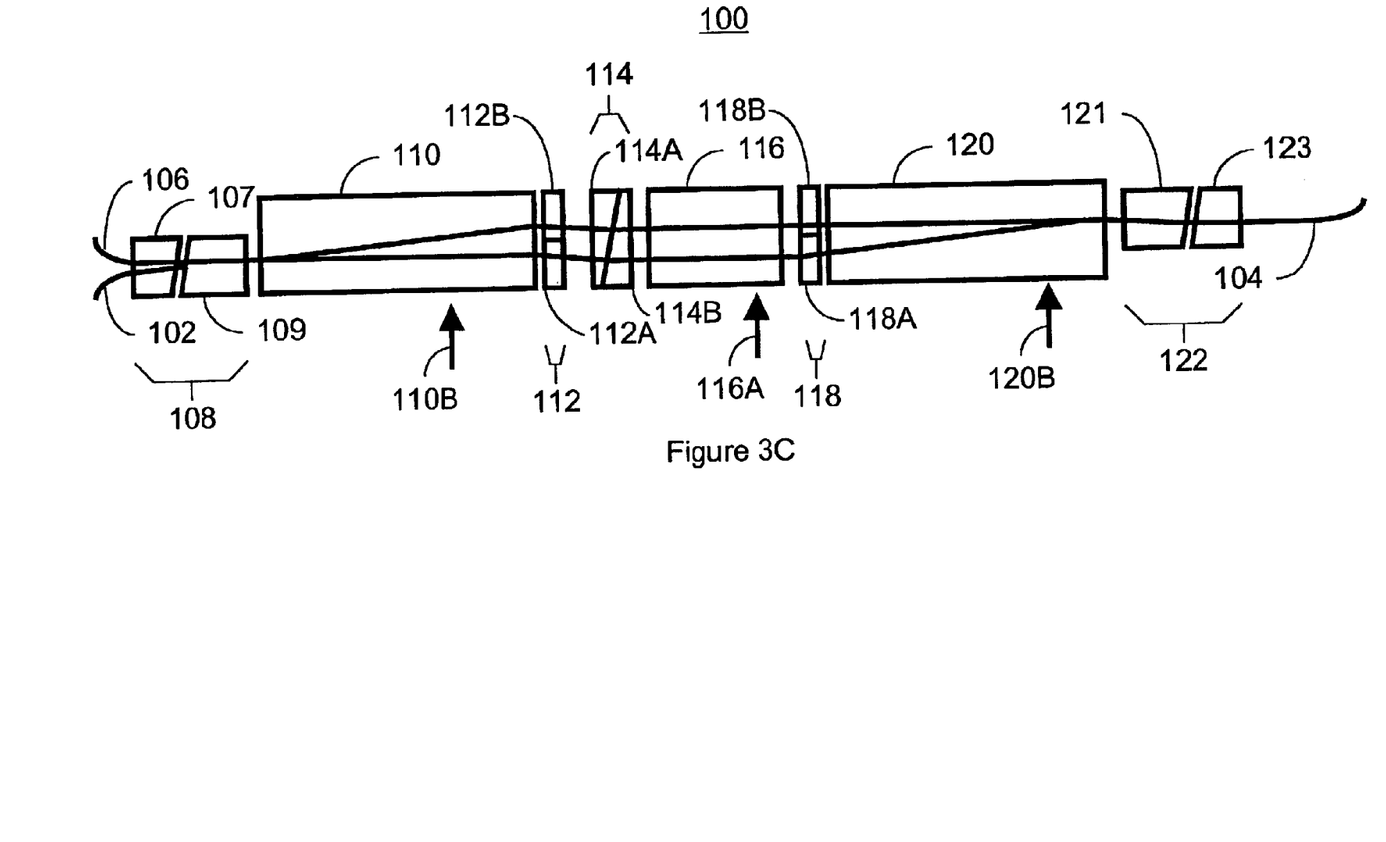
FIG. 3C depicts another side view of the embodiment of an optical circulator in accordance with the present invention.
Figure 3D:
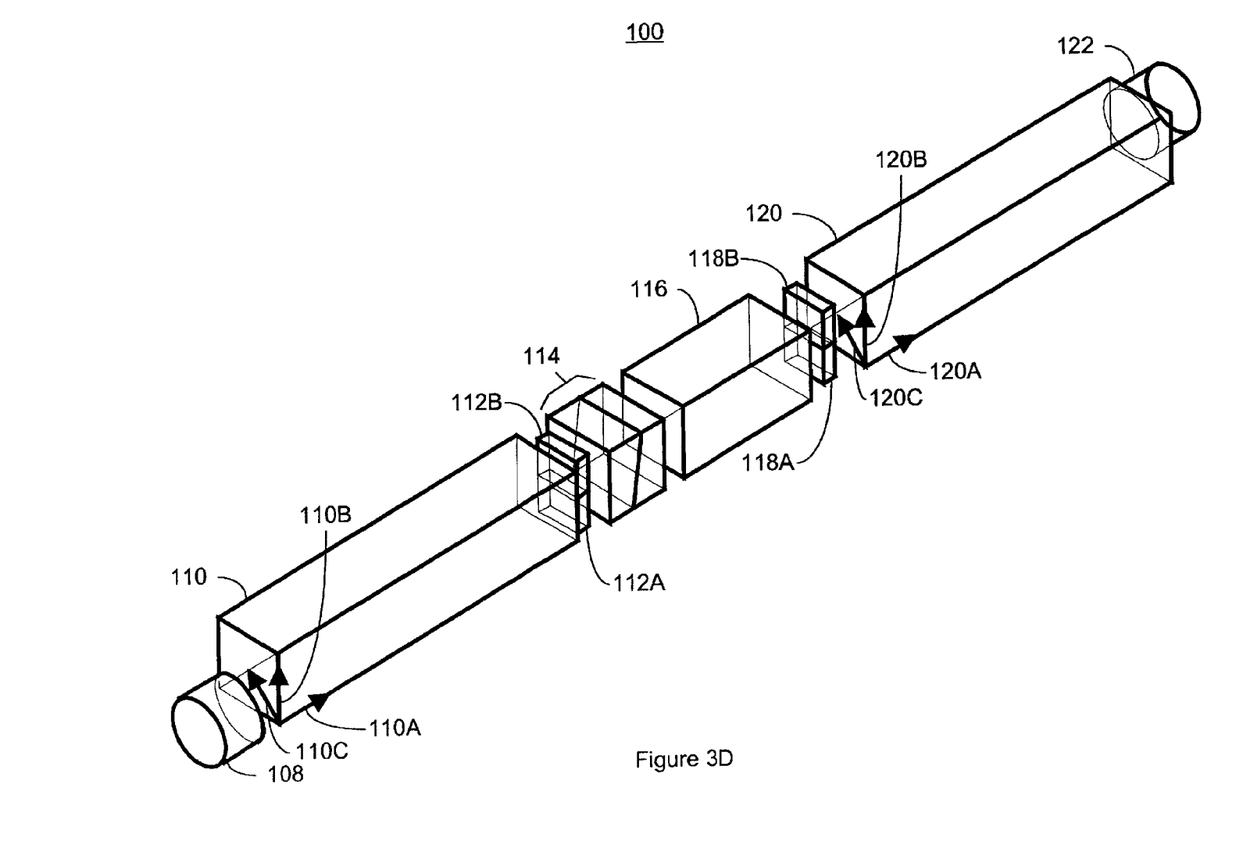
FIG. 3D depicts a three-dimensional view of the embodiment of an optical circulator in accordance with the present invention.

To more particularly illustrate the method and system in accordance with the present invention, refer now to FIGS. 3A, 3B, 3C and 3D depicting one embodiment of an optical circulator 100 in accordance with the present invention. FIG. 3A depicts a top view of the optical circulator 100. FIG. 3B depicts a side view of the optical circulator 100 when an optical signal travels from the first port 102 to the second port 104. FIG. 3C depicts another side view of the embodiment of an optical circulator 100 in accordance with the present invention when the optical signal travels from the second port 104 to the third port 106. FIG. 3D depicts a three-dimensional view of the embodiment of the optical circulator 100 in accordance with the present invention. Also depicted in FIGS. 3A–3D is the optical signal input to the first port 102 and output at the second port 104 and the optical path of the optical signal from the first port 102 to the second port 104.

The optical circulator 100 includes three ports, a first port 102, a second port 104 and a third port 106. The optical circulator 100 is configured such that an optical signal input to the first port 102 will be provided to the second port 104 along a first optical path (depicted in FIGS. 3A and 3B) and an optical signal input to the second port 104 will be provided to the third port 106 along a second optical path (depicted in FIGS. 3A and 3C). However, an optical signal input to the first port 102 will not be transmitted to the third port 106. Similarly, an optical signal input to the second port 104 will not be provided to the first port 102.

The optical circulator 100 includes dual fiber collimator 108 for the first port 102 and the third port 106, as well as a single fiber collimator 122 for the second port 104. The dual fiber collimator 108 includes a capillary 107 for holding fibers for the ports 102 and 106, as well as a lens 109. Similarly, the single fiber collimator 122 includes a capillary 123 for holding the fiber for the port 104 and a lens 121. The optical circulator 100 also includes a first birefringent material 110, a first rotator pair 112, a polarization beam deflector 114, a second birefringent material 116, a second rotator pair 118 and a third birefringent material 120. The polarization beam deflector 114 is preferably a Wollaston prism. The polarization beam deflector 114 is used to introduce a deflection in the optical signal without introducing a walk-off. Thus, as is shown in FIGS. 3A–3C, when the optical signal passes through the polarization beam deflector 114, the direction of propagation of the optical signal changes. Thus, although the optical signal may exit or enter the dual fiber collimator 108 at an angle, the polarization beam deflector 114 allows the signal to travel relatively horizontally through the remainder of the optical circulator 100. This allows the optical circulator 100 to be an in-line optical circulator. Note that FIG. 3D depicts only a portion of collimators 108 and 122 and does not explicitly depict ports 102, 104 and 106.

The rotator pairs 112 and 122 preferably are latching type garnet. The rotator pairs 112A and 112B rotate the direction of polarization of light by 45° counter clockwise and clockwise, respectively. The optical fibers for first port 102 and third port 106 are each held by the glass capillary 107 with two capillary holes separated by a certain distance and positioned symmetrically to the center of the glass capillary 107. The optical fiber for the second port 104 is held by a glass capillary 123 with a single capillary hole located at the center of the glass capillary. The lenses 109 and 121 for the collimators 108 and 122, respectively are preferably C-lenses manufactured by CASIX, Fuzhou, P.R.China. However, in another embodiment, another type of lens such as a GRIN (graduated index of refraction) lens, manufactured by NSG, Japan, can be used. When a C-lens is used, there is lower insertion loss from the lens, allowing a greater working distance between components of the optical circulator 100. The polarization beam deflector 114 is preferably a Wollaston prism and thus preferably includes wedges 114A and 114B.

The first birefringent material 110 and the third birefringent material 120 can each be considered to have axes and a direction in which light having a certain polarization state is walked off. The first birefringent material 110 has a longitudinal axis 110A and a transverse axis 110B. The longitudinal axis 110A is generally in the direction that the optical signal travels, between the first port 102 and the second port 104 and between the second port 104 and the third port 106. The transverse axis 110B is perpendicular to the longitudinal axis. These axes 110A and 110B can be used to define the direction 110C (shown in FIG. 3D) in which the first birefringent material 110 will walk off light that has a particular polarization state. Thus, the first birefringent material 110 walks off light having a particular polarization state in a direction 110C that is at an oblique angle from the transverse axis 110B. The relative orientations of the axes 110A and 110B and the direction 110C can be seen in FIG. 3D. Note that the axes 110A, 110B and 110C are placed at the corner of a face of the first birefringent material 110 to aid in observing the relationship between these axes. In addition, the axes 110A, 110B and 110C are marked with arrows for ease of viewing. In particular, the first birefringent material 110 walks off such light in a direction 110C forty-five degrees from the transverse axis. Similarly, the third birefringent material 120 has a longitudinal axis 120A and a transverse axis 120B. The longitudinal axis 120A is generally in the direction that the optical signal travels, between the first port 102 and the second port 104 and between the second port 104 and the third port 106. The transverse axis 120B is perpendicular to the longitudinal axis. These axes 120A and 120B can be used to define the direction 120C in which the second birefringent material 120 will walk off light that has a particular polarization state. Thus, the third birefringent material 120 walks off light having a particular polarization state in a direction 120C that is at an oblique angle from the transverse axis 120B. The relative orientations of the axes 120A and 120B and the direction 120C can be seen in FIG. 3D. Note that the axes 120A, 120B and 120C are placed at the corner of a face of the third birefringent material 120 to aid in observing the relationship between these axes. In addition, the axes 120A, 120B and 120C are marked with arrows for ease of viewing. In particular, the third birefringent material 120 walks off such light in a direction 120C forty-five degrees from the transverse axis. In addition, the first birefringent material 110 has a length, $L_1$. Similarly, the third birefringent material 120 has a length, $L_3$. The length $L_1$ is sufficient to ensure that the portion of an optical signal that is walked off in the direction 110C by the first birefringent material 110 is spatially separated from the portion of the optical signal that is not walked off by the first birefringent material 110. Similarly, the length $L_3$ is sufficient to ensure that the portion of an optical signal that is walked off in the direction 120C by the second birefringent material 120 is spatially separated from the portion of the optical signal that is not walked off by the second birefringent material 120. The minimum length of $L_1$ is determined by the angle $(\theta_E)$ between two beams from the dual-fiber collimator 108, the total air spacing $(L_a)$ between the front surface of the lens 109 of the dual fiber collimator 108 and the front surface of the first rotator pair 112, the optical beam diameter (D), the first birefringent material 110's ordinary and extraordinary refractive indices $(n_o$ and $n_e)$ and the average refractive index (n). The length of the first birefringent crystal 110 is thus given by:

$$L_1 \geq (2D + 2\sqrt{2}\theta_E L_a)/(n_e/n_o - n_o/n_e - 2\sqrt{2}\theta_E/n)$$

Similarly, the length $L_3$ is sufficient to ensure that the portion of an optical signal that is walked off in the direction 120C by the second birefringent material 120 is spatially separated from the portion of the optical signal that is not walked off by the second birefringent material 120. $L_1$ and $L_3$ are preferably equal in the present invention.

The second birefringent material 116 also has a length, $L_2$. The second birefringent material 116 walks off light having a particular polarization. The direction that the second birefringent material 116 will walk off light is vertical and is shown by the arrow 116A in FIGS. 3B and 3C. The length, $L_2$, of the second birefringent material 116 is set to ensure that a sufficient distance is walked off such that an optical signal from the first port 102 will be provided to the second port 104 and an optical signal from the second port 104 will be provided to the third port 106. In a preferred embodiment, the length of the second birefringent material is:

$$L_2 = 4(L_A + L_1/n)\theta_E/(n_e/n_o - n_o/n_e)$$

Figure 4A:
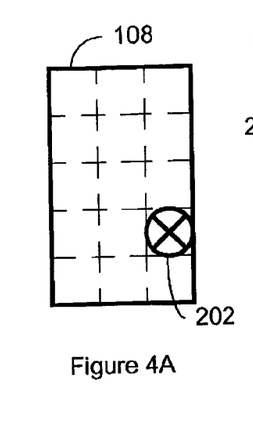
FIGS. 4A–G depicts the polarization after particular components when the optical signal travels from the first port to the second port in one embodiment of the optical circulator in accordance with the present invention.

FIGS. 4A–G indicate the polarizations of components of an input optical signal after being transmitted by particular components when a signal is input at the first port 102 and output at the second port 104. Referring to FIGS. 3A, 3B and 4A–G, the function of one embodiment of the optical circulator 100 having an optical signal input at the first port 102 is described. An optical signal 202 can be decomposed into two states having orthogonal polarization, as depicted in FIG. 4A. The polarization states shown in FIG. 4A are at forty-five degrees from vertical. After collimation by the collimator 108, the optical signal 202 is provided to the first birefringent material 110.

Figure 4B:
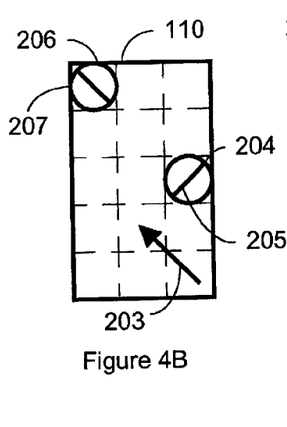

The first birefringent material 110 allows the first polarization state 204 to be transmitted undeflected, but walks off the second polarization state 206 (polarized forty-five degrees counter clockwise from vertical in this embodiment), as depicted in FIG. 4B. The direction that the first birefringent material 110 walks off the second polarization state 206 from a signal input at the first port 102 is forty-five degrees counter clockwise from vertical, as shown by the arrow 203. The first polarization state 204 has a polarization 205 that is forty-five degrees clockwise from vertical, while the second polarization state 206 has a polarization 207 that is forty-five degrees counter clockwise from vertical. In addition, both the first polarization state 204 and the second polarization state 206 are walked off vertically because the beam exiting from the first collimator 108 is angled.

Figure 4C:
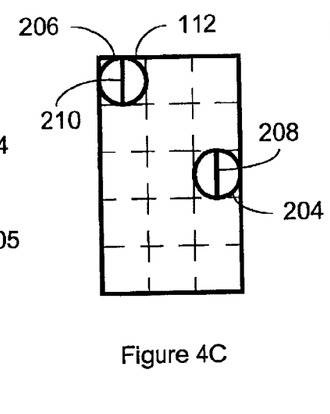
Figure 4D:
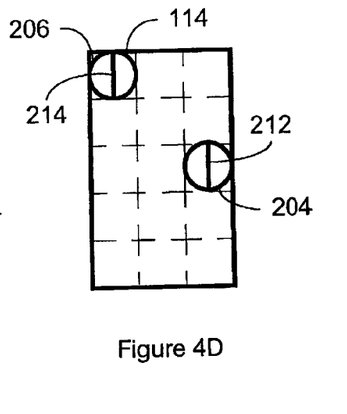

The first pair of rotators 112 then rotates the first and second polarization states by 45° counter clockwise and clockwise, respectively. Thus, as depicted in FIG. 4C, the first polarization state 204 and the second polarization state 206 have the same polarization 208 and 210, respectively. These polarizations 208 and 210 are vertical. As shown in FIG. 4D, the first polarization state 204 and the second polarization state 206 are then deflected by the polarization beam deflector 114 in a clockwise direction. Thus, although the first polarization state 204 and the second polarization state 206 are not offset spatially by the polarization beam deflector 114 and have the same polarizations 212 and 214, respectively, they are angularly deflected in a clockwise direction.

Figure 4E:
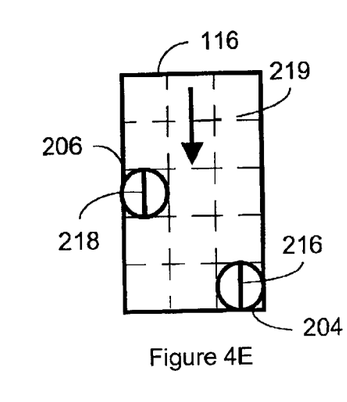

FIG. 4E depicts the first polarization state 204 and the second polarization state 206 after transmission through the second birefringent material 116. Both the first polarization state 204 and the second polarization state 206 are walked-off vertically by a distance due to the second birefringent material 116. However, both the first polarization state 204 and the second polarization state 206 have vertical polarizations 216 and 218, respectively. The direction that the second birefringent material 116 walks off the first polarization state 204 and the second polarization state 206 which are both vertically polarized and from a signal input at the first port 102 is right, as shown by the arrow 219.

Figures 4F, 4G:
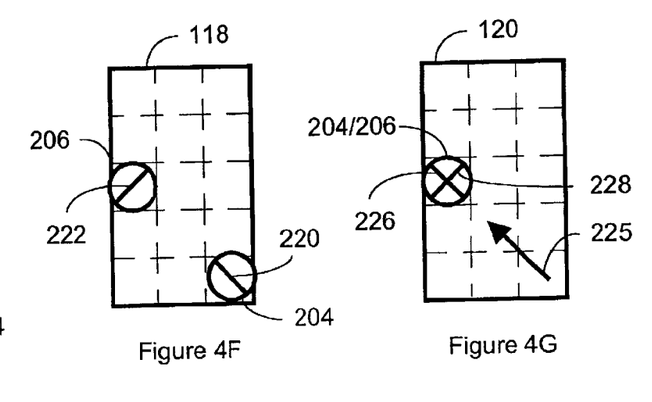

FIG. 4F depicts the first polarization state 204 and the second polarization state 206 when exiting the second pair of rotators 118. The second pair of rotators 118 rotates the first and second polarization states by 45° counter clockwise and clockwise, respectively. Thus, the first polarization state 204 has a polarization 220 that is forty-five degrees counterclockwise from vertical, while the second polarization state 206 has a polarization 222 that is forty-five degrees clockwise from vertical.

FIG. 4G depicts the first polarization state 204 and the second polarization state 206 when exiting the third birefringent material 120. The first polarization state 204 is walked off such that the first polarization state 204 is walked off to the position of the second polarization state 206. The direction that the third birefringent material 120 walks off the first polarization state 204 from a signal input at the first port 102 is forty-five degrees counter clockwise from vertical, as shown by the arrow 225. Thus, the first polarization state 204 coincides with and has the same direction of propagation as the second polarization state 206, allowing the two states to recombine into a single optical signal that has orthogonally polarized components 226 and 228.

Figure 5A:
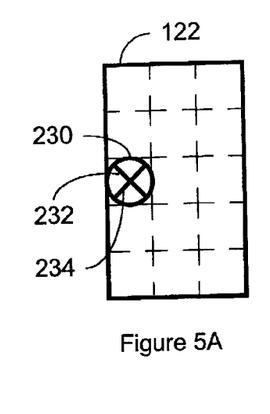
FIGS. 5A–G depicts the polarization after particular components when the optical signal travels from the second port to the third port in one embodiment of the optical circulator in accordance with the present invention.
Figure 5B:
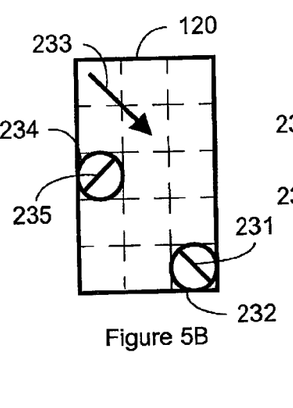

FIGS. 5A–G depict the polarization and location of the optical signal after particular components when the optical signal travels from the second port 104 to the first port 102 in one embodiment of the optical circulator in accordance with the present invention. Referring to FIGS. 3A, 3C and 5A–G, the function one embodiment of the optical circulator 100 having an optical signal input at the second port 104 is described. An optical signal 230 can be decomposed into two states, 232 and 234, having orthogonal polarization, as depicted in FIG. 5A. After collimation by the collimator 122, the optical signal 230 is provided to the third birefringent material 120. The third birefringent material 120 allows the first polarization state 232 to be walked off at an angle of forty-five degrees clockwise from horizontal, but transmits undeflected the second polarization state 234, as depicted in FIG. 5B. The direction that the third birefringent material 120 walks off the first polarization state 232 from a signal input at the second port 104 is forty-five degrees clockwise from horizontal, as shown by the arrow 233. In this embodiment, the first polarization state 232 has a polarization 231 that is forty-five degrees counter clockwise from vertical while the second polarization state 234 has a polarization 235 that is forty-five degrees clockwise from vertical.

Figure 5C:
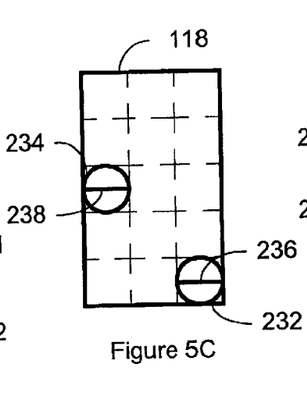

The second pair of rotators 118 then rotates the first and second polarization states by 45° counter clockwise and clockwise, respectively. Thus, as depicted in FIG. 5C, the first polarization state 232 and the second polarization state 234 have the same polarizations 236 and 238, respectively. The polarizations 236 and 238 are horizontal.

Figure 5D:
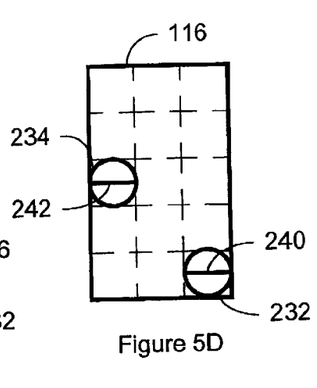

FIG. 5D depicts the first polarization state 232 and the second polarization state 234 when exiting the second birefringent material 116. Both the first polarization state 232 and the second polarization state 234 are not walked off by the second birefringent material 116. In addition, the polarization of the first polarization state 232 and the second polarization state 234 are unchanged, having polarizations 240 and 242 that are horizontal.

Figure 5E:
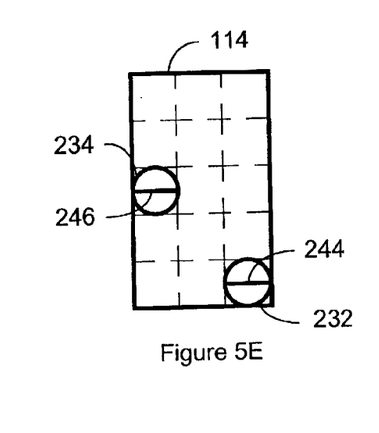

FIG. 5E depicts the first polarization state 232 and the second polarization state 234 after transmission by the polarization beam deflector 112. The first polarization state 232 and the second polarization state 234 are deflected by the polarization beam deflector 112 in a clockwise direction. Thus, although the first polarization state 232 and the second polarization state 234 are not offset spatially by the polarization beam deflector 112 and have the same polarization, they are angularly deflected in a clockwise direction. Thus, the polarization 244 of the first polarization state 232 and the polarization 246 of the second polarization state 234 are horizontal.

Figure 5F:
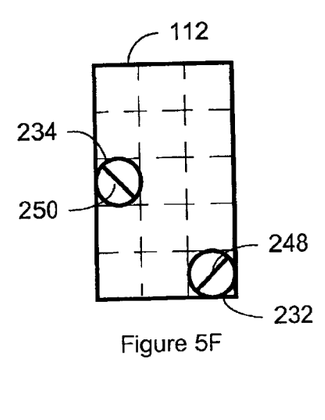

FIG. 5F depicts the first polarization state 232 and the second polarization state 234 when exiting the first pair of rotators 112. The first pair of rotators 112 rotates the first polarization state 232 and the second polarization state 234 by 450 counter clockwise and clockwise, respectively. Thus, the first polarization state 232 has a polarization 248 that is forty-five degrees counter clockwise from horizontal, while the second polarization state 234 has a polarization 250 that forty-five degrees counter clockwise from vertical.

Figure 5G:
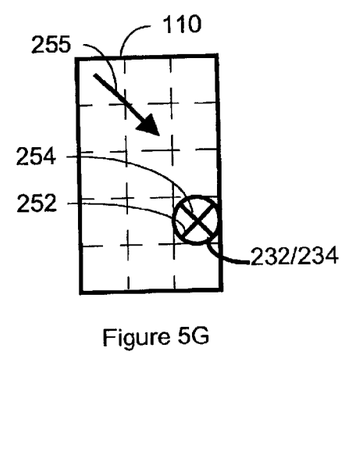

FIG. 5G depicts the first polarization state 232 and the second polarization state 234 when exiting the first birefringent material 110. The first polarization state 232 is spatially undeflected and has a polarization 252 that is forty-five degrees counter clockwise from horizontal. However, the second polarization 234, which has a polarization 254 that is forty-five degrees counter clockwise from vertical, is walked off to the position of the first polarization state 232. The direction that the first birefringent material 110 walks off the second polarization state 234 from a signal input at the second port 104 is forty-five degrees clockwise from horizontal, as shown by the arrow 255. Thus, the first polarization state 232 coincides with and has the same direction of propagation as the second polarization state 234, allowing the two states to recombine into a single optical signal. In addition, both the first polarization state 232 and the second polarization state 234 are walked off vertically because the beam exiting from the polarization beam deflector 114 is angled clockwise from horizontal.

Thus, the optical circulator 100 functions. In addition, the configuration of elements and elements used in the optical circulator provide several advantages. Because no half wave plates are used, the configuration of the optical circulator 100 is much simpler and has a broader temperature bandwidth for isolation between the first and second optical paths. Moreover, no alignment need be performed between the rotator pairs 112 and 118 and any half wave plates. Furthermore, when latching type garnet rotators 112A, 112B, 118A and 118B are used, the footprint of the optical circulator 100 can be further reduced. Moreover, when C-lenses are used in the collimators 108 and 122, a lower insertion loss can be achieved. Thus, the optical circulator 100 in accordance with the present invention is simpler in configuration, more easily manufactured, has a lower cost than a conventional system and a broader temperature bandwidth for isolation. In addition, the optical circulator 100 may have a smaller footprint and a lower insertion loss.

A method and system has been disclosed for providing an optical circulator which may have low losses and be low in cost to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical circulator comprising:
   a first port;
   a second port opposite to the first port;
   a third port adjacent to the first port;
   a first birefringent material optically coupled to the first port and the third port, the first birefringent material having a longitudinal axis, a transverse direction perpendicular to the longitudinal axis, a first displacement direction and a first length, the first displacement direction being at a first oblique angle from the transverse direction;
   a first rotator pair, the first birefringent material being between first rotator pair and the first port;
   a second birefringent material, the first rotator pair being between the first birefringent material and the second birefringent material, the second birefringent material having a second longitudinal axis and a second displacement direction, the second displacement direction being perpendicular to the longitudinal axis.
   a beam deflector for altering a direction of the first optical path and the second optical path, the beam deflector being located between the first rotator pair and the second birefringent material such that the beam deflector is directly optically coupled to the second birefringent material;
   a second rotator pair, the second birefringent material being between the first rotator pair and the second rotator pair; and
   a third birefringent material, the third birefringent material having a third longitudinal axis parallel to the longitudinal axis, the transverse direction perpendicular to the third longitudinal axis, a third displacement direction and a second length, the third displacement direction being at a second oblique angle from the transverse direction;
   wherein a first optical path is established from the first port to the second port, and a second optical path is established from the second port to the third port such that when an optical signal is input at the first port the optical signal travels along the first optical path to the second port and when the optical signal is input to the second port the optical signal travels along the second optical path to the third port.

2. The optical circulator of claim 1 wherein the beam deflector is a polarization beam deflector for altering a direction of the first optical path and the second optical path, the polarization beam deflector being located between the first rotator pair and the second birefringent material.

3. The optical circulator of claim 1 wherein the first rotator pair includes a first rotator and a second rotator, the first rotator rotating a polarization of an optical signal in a first direction, the second rotator rotating the polarization of the optical signal in a second direction opposite to the first direction; and
   wherein the second rotator pair includes a third rotator and a fourth rotator, the third rotator rotating the polarization of the optical signal in the second direction, the fourth rotator rotating the polarization of the optical signal in the first direction.

4. The optical circulator of claim 1 wherein the first rotator further includes a first latching type garnet component, the second rotator includes a second latching type garnet component, the third rotator further includes a third latching type garnet component and the fourth rotator includes a fourth latching type garnet component, the first latching type garnet component rotating the polarization of the optical signal by 45° in the first direction, the second latching type garnet component rotating the polarization of the optical signal by 45° in the second direction, the third latching type garnet component rotating the polarization of the optical signal by 45° in the second direction, the fourth latching type garnet component rotating the polarization of the optical signal by 45° in the first direction.

5. The optical circulator of claim 1 wherein the first and second oblique angles are each 45° from the transverse direction.

6. The optical circulator of claim 1 wherein the first length of the first birefringent material is sufficient to ensure that the first optical path is separated from the second optical path at the first birefringent material.

7. The optical circulator of claim 1 wherein the second length of the third birefringent material is sufficient to ensure that the first optical path is separated from the second optical path at the third birefringent material.

8. The optical circulator of claim 1 wherein the optical signal is capable of being decomposed into a first portion having a first polarization and a second portion having a second polarization and wherein the second birefringent material allows the first polarization state to be transmitted undeflected and the second polarization state to be transmitted with after being walked off by a first distance.

9. The optical circulator of claim 1 wherein the first port further includes a first fiber, the second port includes a second fiber, and the third port includes a third fiber.

10. The optical circulator of claim 1 further comprising a first collimator coupled to the first port and the third port, the first collimator including a C-lens or a GRIN lens.

11. The optical circulator of claim 10 further comprising a second collimator coupled to the second port, the second collimator including a C-lens or a GRIN lens.

12. A method utilizing an optical circulator, the optical circulator including a first port, a second port and a third port adjacent to the first port, the method comprising the steps of:
   (a) inputting the optical signal to a first port or a second port opposite to the first port;
   (b) transmitting the optical signal through a means for establishing a first optical path and a second optical path such that when an optical signal is input at the first port the optical signal travels along the first optical path to the second port and when the optical signal is input to the second port the optical signal travels along the second optical path to the third port, the first optical path from the first port to the second port, the second optical path from the second port to the third port, the optical path establishing means including a first birefringent material optically coupled to the first port and the third port, the first birefringent material having a longitudinal axis, a transverse direction perpendicular to the longitudinal axis, a first displacement direction and a first length, the first displacement direction being at a first oblique angle from the transverse direction, a first rotator pair, the first birefringent material being between first rotator pair and the first port, the first rotator pair includes a first rotator and a second rotator, the first rotator rotating a polarization of an optical signal in a first direction, the second rotator rotating the polarization of the optical signal in a second direction opposite to the first direction, a second birefringent material, the first rotator pair being between the first birefringent material and the second birefringent material, the second birefringent material having the longitudinal axis and a second displacement direction, the second displacement direction being perpendicular to the longitudinal axis, a second rotator pair, the second birefringent material being between the first rotator pair and the second rotator pair, the second rotator pair including a third rotator and a fourth rotator, the third rotator rotating the polarization of the optical signal in the second direction, the fourth rotator rotating the polarization of the optical signal in the first direction, and a third birefringent material, the third birefringent material having the longitudinal axis, the transverse direction perpendicular to the longitudinal axis, a third displacement direction and a second length, the third displacement direction being at a second oblique angle from the transverse direction;

wherein the first optical path and second optical path establishing means establish the first optical path and the second optical path without the use of wave plates.

13. The method of claim 12 wherein the first optical path and the second optical path establishing means further includes:

a first rotator pair, the first birefringent material being between first rotator pair and the first port;

a beam deflector for altering a direction of the first optical path and the second optical path, the beam deflector being located between the first rotator pair and the second birefringent material such that the beam deflector is directly optically coupled to the second birefringent material.

14. The method of claim 12 wherein the transmitting step (b) further includes the step of:

(b1) transmitting the optical signal through a polarization beam deflector for altering a direction of the first optical path and the second optical path, the polarization beam deflector being located between the first rotator pair and the second birefringent material.

15. The method of claim 14 wherein the first rotator further includes a first latching type garnet component, the second rotator includes a second latching type garnet component, the third rotator further includes a third latching type garnet component and the fourth rotator includes a fourth latching type garnet component, the first latching type garnet component rotating the polarization of the optical signal by 45° in the first direction, the second latching type garnet component rotating the polarization of the optical signal by 45° in the second direction, the third latching type garnet component rotating the polarization of the optical signal by 45° in the second direction, the fourth latching type garnet component rotating the polarization of the optical signal by 45° in the first direction.

16. The method of claim 12 wherein the first and second oblique angles are each 45° from the transverse direction.

17. The method of claim 12 wherein the first length of the first birefringent material is sufficient to ensure that the first optical path is separated from the second optical path at the first birefringent material.

18. The method of claim 12 wherein the second length of the third birefringent material is sufficient to ensure that the first optical path is separated from the second optical path at the third birefringent material.

19. The method of claim 12 wherein the optical signal is capable of being decomposed into a first portion having a first polarization and a second portion having a second polarization and wherein the second birefringent material allows the first polarization state to be transmitted undeflected and the second polarization state to be transmitted with after being walked off by a first distance.

20. The method of claim 12 wherein the first port further includes a first fiber, the second port includes a second fiber, and the third port includes a third fiber.

21. The method of claim 12 further comprising a first collimator coupled to the first port and the third port, the first collimator including a C-lens or a GRIN lens.

22. The method of claim 12 further comprising a second collimator coupled to the second port, the second collimator including a C-lens or a GRIN lens.

23. An optical circulator comprising:

a first port;

a second port opposite to the first port;

a third port adjacent to the first port;

means for establishing a first optical path and a second optical path, the first optical path from the first port to the second port, the second optical path from the second port to the third port such that when an optical signal is input at the first port the optical signal travels along the first optical path to the second port and when the optical signal is input to the second port the optical signal travels along the second optical path to the third port, the optical path establishing means including a first birefringent material optically coupled to the first port and the third port, the first birefringent material having a longitudinal axis, a transverse direction perpendicular to the longitudinal axis, a first displacement direction and a first length, the first displacement direction being at a first oblique angle from the transverse direction;

a second birefringent material, the first birefringent material being between the first port and the second birefringent material, the second birefringent material having a second longitudinal axis and a second displacement direction, the second displacement direction being perpendicular to the longitudinal axis, a third birefringent material, the second birefringent material being between the first birefringent material and the third birefringent material, the third birefringent material having a third longitudinal axis parallel to the longitudinal axis, the transverse direction perpendicular to the third longitudinal axis, a third displacement direction and a second length, the third displacement direction being at a second oblique angle from the transverse direction;

wherein the first optical path and second optical path establishing means establish the first optical path and the second optical path without the use of wave plates.

24. The optical circulator of claim 23 wherein the first optical path and the second optical path establishing means further includes:

a first rotator pair, the first birefringent material being between first rotator pair and the first port;

a beam deflector for altering a direction of the optical path and the second optical path, the beam deflector being located between the first rotator pair and the second birefringent material such that the beam deflector is directly optically coupled to the second birefringent material.

* * * * *